United States Patent
Lassar

(10) Patent No.: US 6,751,004 B2
(45) Date of Patent: Jun. 15, 2004

(54) OPTICAL SYSTEM WITH MAGNETORHEOLOGICAL FLUID

(75) Inventor: Noah C. Lassar, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 75 days.

(21) Appl. No.: 10/286,209

(22) Filed: Oct. 31, 2002

(65) Prior Publication Data
US 2004/0085613 A1 May 6, 2004

(51) Int. Cl.[7] .............. G02F 1/09; G02F 1/03; G02F 1/29; G02B 26/00; G01N 11/06
(52) U.S. Cl. .......... 359/280; 359/296; 359/252; 359/253; 359/320; 252/570; 252/572; 252/74; 252/62.52; 73/54.07
(58) Field of Search .......... 359/280, 281, 359/282, 283, 284, 484, 320, 296; 252/62.52, 73, 74, 75, 77, 570, 572; 188/267; 507/100; 73/54.07

(56) References Cited

U.S. PATENT DOCUMENTS

| | | | |
|---|---|---|---|
| 5,925,288 A | * 7/1999 | Umamori et al. | 252/572 |
| 6,159,396 A | * 12/2000 | Fujita et al. | 252/572 |
| 6,221,138 B1 | * 4/2001 | Kenny | 106/31.32 |
| 6,280,658 B1 | * 8/2001 | Atarashi et al. | 252/572 |
| 6,395,193 B1 | 5/2002 | Kintz et al. | |
| 6,454,059 B1 | * 9/2002 | Lonbani et al. | 188/267 |
| 6,598,465 B2 | * 7/2003 | Shin et al. | 73/54.07 |
| 6,645,403 B1 | * 11/2003 | Park et al. | 252/570 |
| 2003/0166470 A1 | * 9/2003 | Fripp et al. | 507/100 |

OTHER PUBLICATIONS

SPIE's Symposium on Design, Test, Integration, and Packaging of MEMS/MOEMS, MEMS, May 9–11, 2000, Paris, France, "Acousto–Magnetic Components for use in a Hearing Instrument" (14 pages).

Data brochure, GROUP ARNOLD, National–Arnold Magnetics, Jul. 2001, "Wound Magnetics" (11 pages).

* cited by examiner

Primary Examiner—Loha Ben

(57) ABSTRACT

An optical system includes a layer of magneto rheological (MR) fluid having a surface exposed to air or vacuum. The MR fluid has a first state wherein the surface is reflective, and a second state wherein the surface is non-reflective. A magnetic actuator selectively applies a magnetic field to the MR fluid to actuate the fluid to the second state.

32 Claims, 7 Drawing Sheets

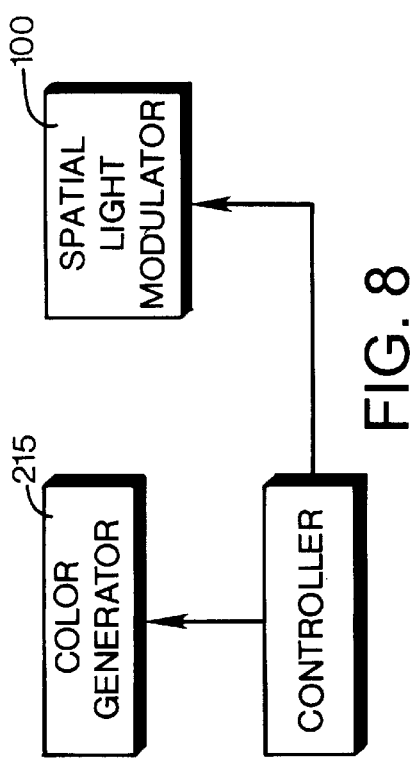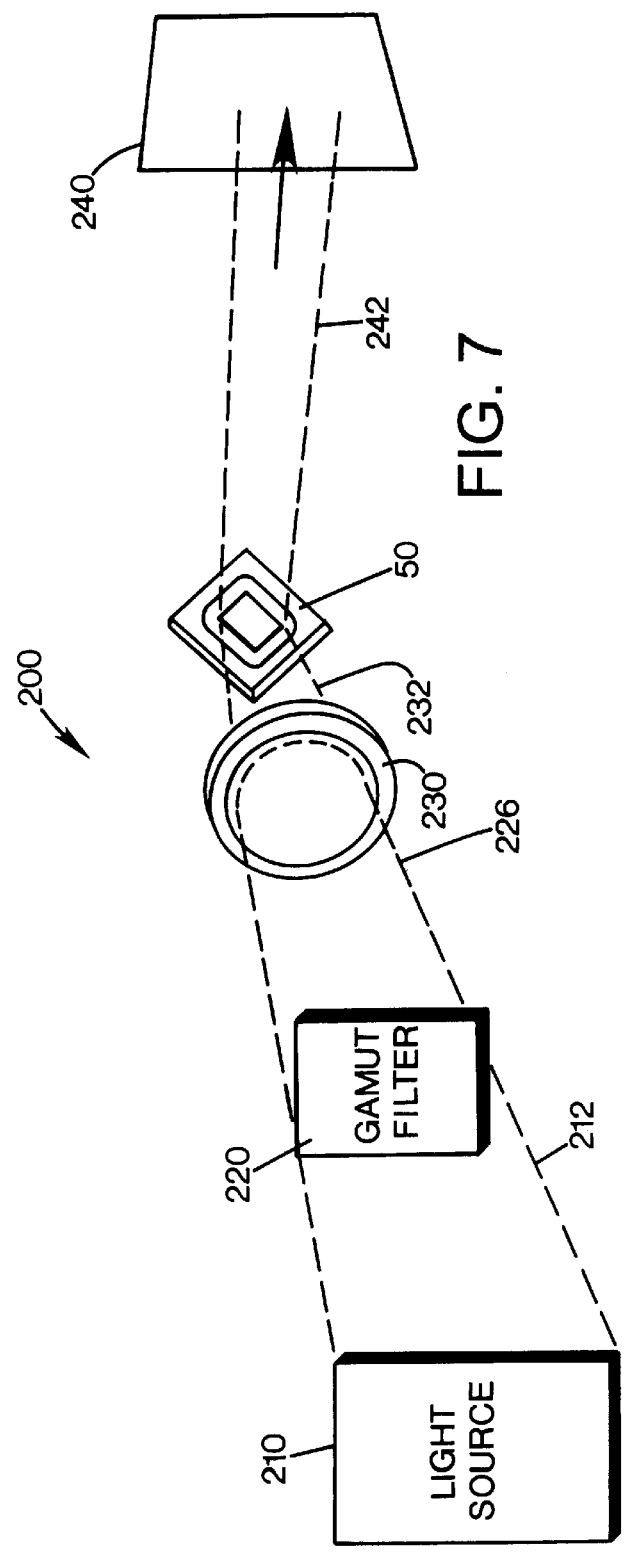

OPTICAL SYSTEM WITH MAGNETORHEOLOGICAL FLUID

BACKGROUND OF THE DISCLOSURE

Optical switching and spatial light modulation are needed in such applications as optical communication and display systems. Prior techniques using complicated arrays of small mirrors have been difficult to manufacture, resulting in low yields and expensive products.

There is a need for optical systems such as optical switches and spatial light modulators which are simple to manufacture and have no moving mechanical parts.

BRIEF DESCRIPTION OF THE DRAWING

Features and advantages of the disclosure will readily be appreciated by persons skilled in the art from the following detailed description when read in conjunction with the drawing wherein:

FIG. 7 illustrates a projector system employing the system of FIGS. 4–6B.

FIG. 8 is a schematic block diagram of the control system of the projector system of FIG. 7.

DETAILED DESCRIPTION OF THE DISCLOSURE

Magneto rheological (MR) fluids contain field polarizable particles and a liquid carrier. The MR fluids are responsive to magnetic fields, with the field polarizable particles becoming polarized and organized into chains of particles. Such chains increase the viscosity of the fluid. In the absence of a magnetic field, the particles are in an unorganized state, and the MR fluid has a lower viscosity than when the fluid is exposed to a magnetic field.

Figure 1:
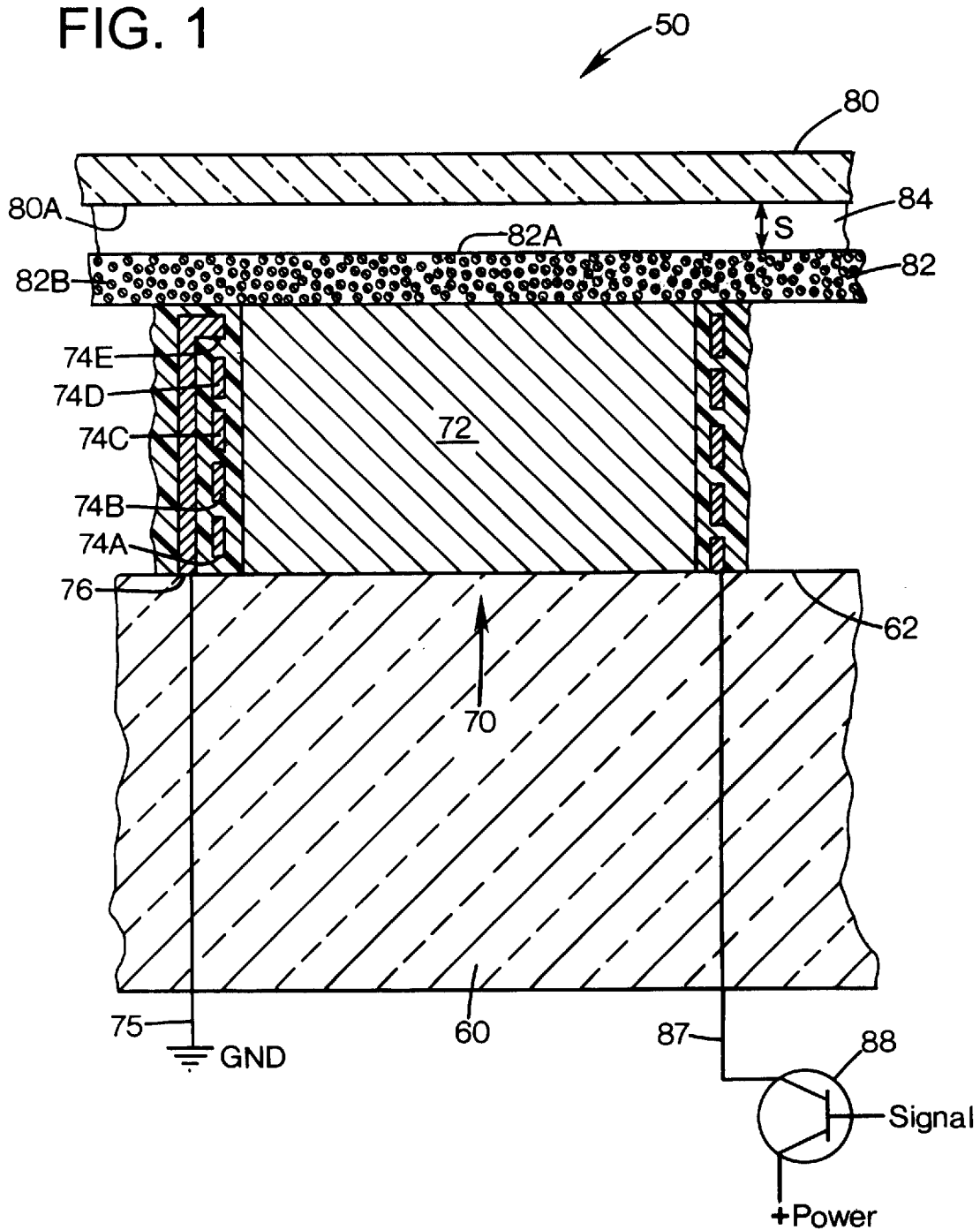
FIG. 1 illustrates in schematic cross-section an exemplary embodiment of this invention which can be employed as an optical switch or a spatial light modulator.
Figure 2:
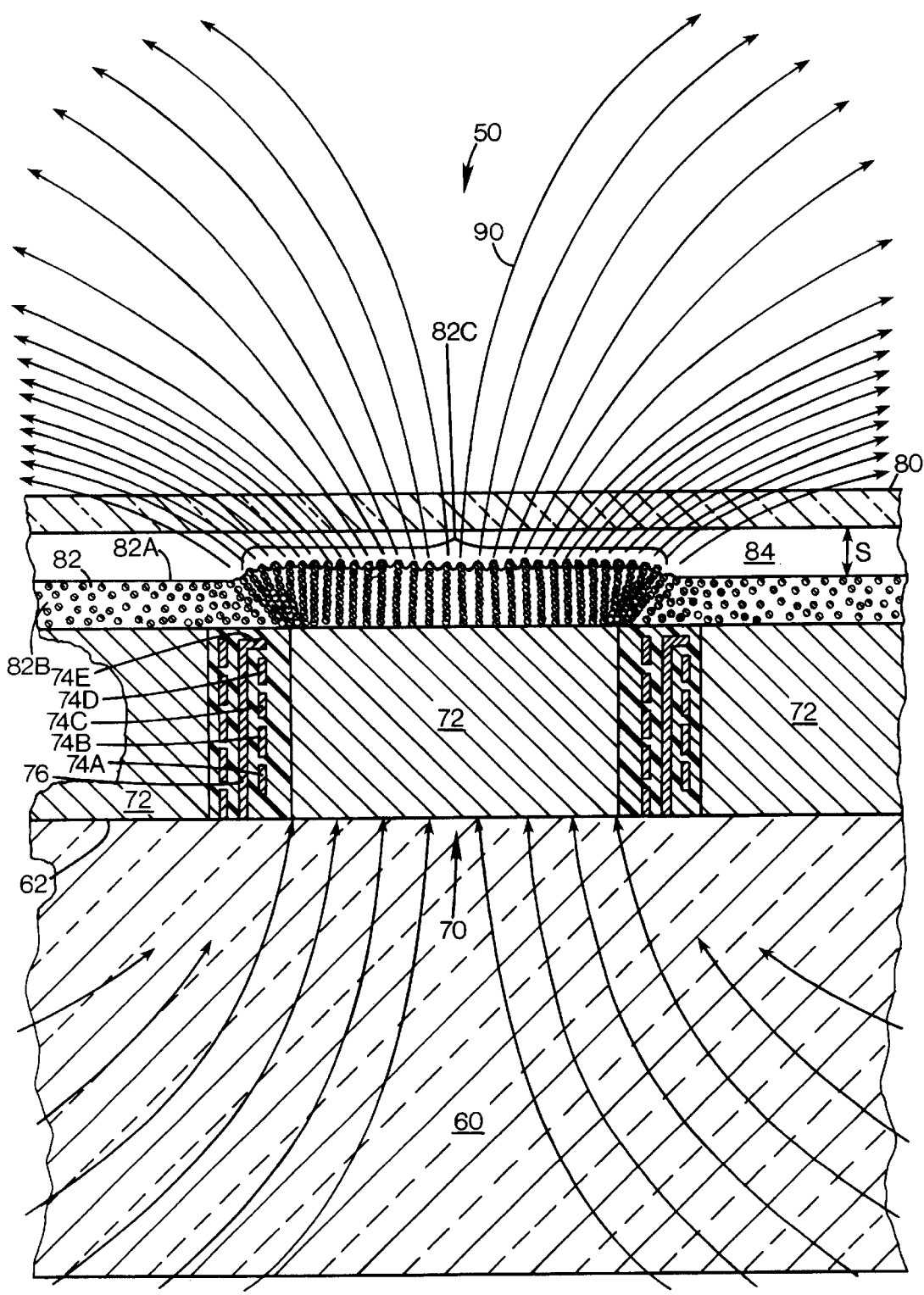
FIG. 2 shows the switch of FIG. 1, illustrating the electromagnet in an energized state.

FIGS. 1 and 2 illustrate in schematic cross-section an exemplary embodiment of this invention, a system 50 which can be employed as an optical switch array or a spatial light modulator. The system is fabricated on a top surface 62 of a substrate 60, which can be any material on which a thin film can be deposited, such as silicon, glass or plastic. One or more transistor-activated electromagnets 70 is deposited on the substrate. An MR fluid 82 having a reflective surface 82A is sandwiched between the array of electromagnets and a transparent cover 80. The cover can be fabricated from a transparent material, e.g., glass or plastic. An air or vacuum gap 84 is provided between the reflective surface 82A and the bottom surface 80A of the cover. The spacing between the reflective surface 82A and the bottom surface 80A of the cover is at least as large as the amplitude of the surface irregularity of the MR fluid 82, which is caused by activation of the electromagnet 70, as will be described below.

The electromagnet 70 is formed using wafer fabrication methods in this exemplary embodiment, and can be made on the order of 100 microns by 100 microns. The electromagnet includes a core 72 of magnetic material, e.g., supermalloy (79% nickel, 15% iron, 5% molybdenum) in an exemplary embodiment. A series of conductive coils 74A–74E are fabricated around the core 72 on successive layers, separated by insulator layers, from a conductive material such as copper. An exemplary material suitable for the insulator layers is bisbenzo-cyclobutene, applied using spin-coating techniques. The coils are formed in half turns on each coil layer, connected together in series by conductive vias passing from one coil layer to the next to form a magnet coil 74. The end of the top coil 74E is connected to a ground conductor 76, formed by an aligned series of vias. The center and outer terminals of each coil are connected by vertical conductive vias formed in the substrate to buried layers on which the transistor switch circuitry is fabricated. In an exemplary embodiment, the core 72 and coil 74 have a square or rectangular footprint on the substrate, although other configurations can alternatively be employed. A square footprint is suitable to forming arrays of the micro electromagnets on the substrate. Exemplary techniques for forming the electromagnets are known in the art, e.g. "MEMS Acousto-Magnetic Components for use in a Hearing Instrument," S. Chowdhury et al., SPIE Symposium on Design, Test, Integration and Packaging of MEMS/MOEMS, May 9–11, 2000, Paris, France.

The ground conductor 76 is connected to ground, indicated schematically by line 75. The end of the coil 74A is connected through a transistor switch to a voltage source, as indicated schematically by line 87 and switch 88. In an exemplary implementation of switch 50, the transistor switch is formed in a buried layer structure under the coil and core.

The MR fluid 82 is spread evenly over the surface of the electromagnet, and is confined by the transparent cover 80. A wall structure (not shown) can be used to provide a side containment structure. In this exemplary embodiment, the MR fluid includes carbonyl iron particles 82B. When the electromagnet 70 is activated by passing current through a transistor switch 88, a magnetic field is established as indicated by the field lines 90 in FIG. 2, and the MR fluid directly above the electromagnet self-organizes, causing surface irregularities. The fluid above the electromagnet becomes dark and non-reflective. This is illustrated in FIG. 2, where the area 82C above electromagnet 70 is roughened. FIG. 2 also shows adjacent electromagnets, forming an array of electromagnets. The ground line and transistor switch are not shown in FIG. 2. By shining light onto the surface of the MR fluid, light can be actively reflected or absorbed. Thus, the system 50 can be used as an optical switch or light modulator for modulating a light beam, which can be used by directing the light beam onto the surface of the magneto rheological (MR) fluid, which has a first state wherein the surface is reflective to reflect the light beam, and a second state wherein the surface is non-reflective. By selectively applying a magnetic field to the MR fluid to actuate the fluid to the second state, the intensity of a portion of the light beam reflected from the surface of the MR fluid can be modulated.

The particular configuration of the system for a given application will depend on the application requirements. The variables include carbonyl-iron particle size, fluid viscosity, thickness of the fluid layer, proximity of the fluid to the electromagnet, number of turns in the electromagnet coils, proximity of the coils to the ferromagnetic core, the current through the micro-electromagnet coils, and the materials being used for the magnetic core, the coils, and the insulating material.

To increase the strength of the magnetic field, more turns can be produced in the coils surrounding the ferromagnetic core either by increasing the number of concentric coils in a single layer, or by increasing the number of stacked coil layers, or a combination of the two. The strength of the magnetic field can also be increased by increasing the current through the coils of the electromagnet. To increase the effect of the magnetic field on the carbonyl-iron particles, either the particles can be made smaller, thereby reducing their inertia, or the viscosity of the fluid can be reduced, or a combination of both. The closer the fluid is to the electromagnet, the greater the effect of the magnetic field is on the carbonyl-iron particles.

Figure 3:
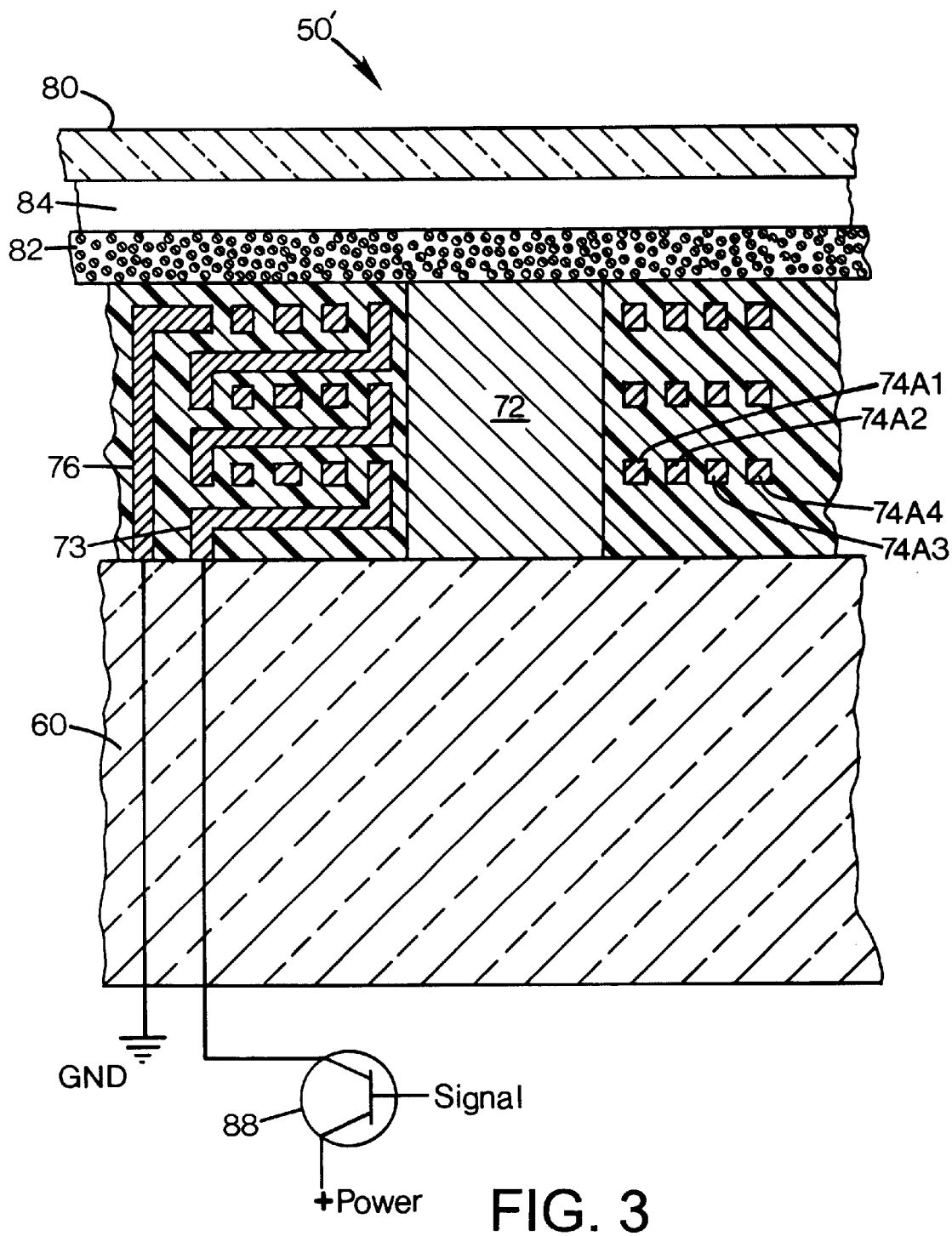
FIG. 3 illustrates an embodiment of an optical switch in accordance with the invention, in which the coils of the electromagnetic are wrapped in concentric coils on each layer.
Figure 4:
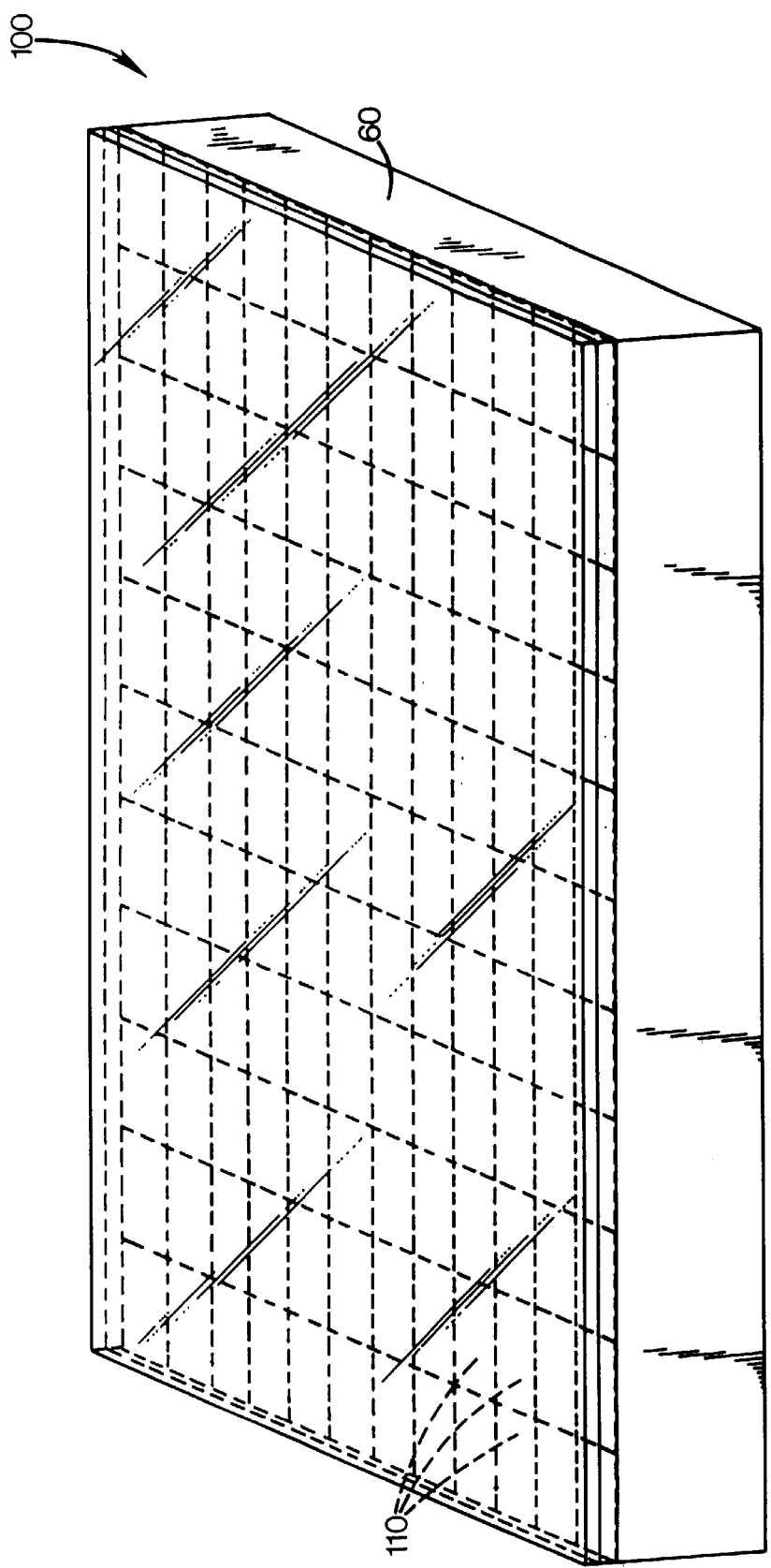
FIG. 4 is a simplified isometric view of an exemplary embodiment of a system in accordance with the invention which can be employed as an optical switch array or a spatial light modulator.

FIG. 3 illustrates an embodiment of a system 50' in which the coils of the electromagnetic are wrapped in concentric coils on each layer. Thus, a conductor line 73 leads to a "hot" side of the coil structure, and each layer has multiple concentric coil portions. For example, on one layer, concentric coil portions 74A1–74A5 are formed, to increase the magnetic field over the embodiment of FIGS. 1–2.

There will be trade-offs which will effect the size and packing density of the micro-electromagnet elements. For instance, if the coils are wrapped in concentric rings around the core, they will take up more area than if they were stacked as single coils. The cost of manufacturing multiple coil layers will place an upper bound on the number of stacked layers the electromagnet can have. There is also a maximum current that the micro-magnetic coils can tolerate before overheating and fusing.

FIGS. 4–6B illustrate an exemplary embodiment of this invention, a system 100 which can be employed as an optical switch array or a spatial light modulator. The system is fabricated on a top surface 62 of a substrate 60, as described above regarding the system of FIGS. 1–2. An array of the switch-activated electromagnets 70 is deposited on the substrate. In an exemplary embodiment, the electromagnets each cover an area nominally 100 microns by 100 microns. The MR fluid 82 having a reflective surface 82A is sandwiched between the array of electromagnets and a transparent cover 80. The system 100 forms an optical switch/spatial light modulator comprising an array of optical switch elements 110, wherein each optical switch is activated by one of the electromagnets 70. By shining light onto the surface of the array, light at each electromagnet element (pixel) can be actively reflected or absorbed. Using collimated light is preferable, although bright focused light can be used. In this embodiment, the optical switch elements are arranged in rows and columns.

Figure 5:
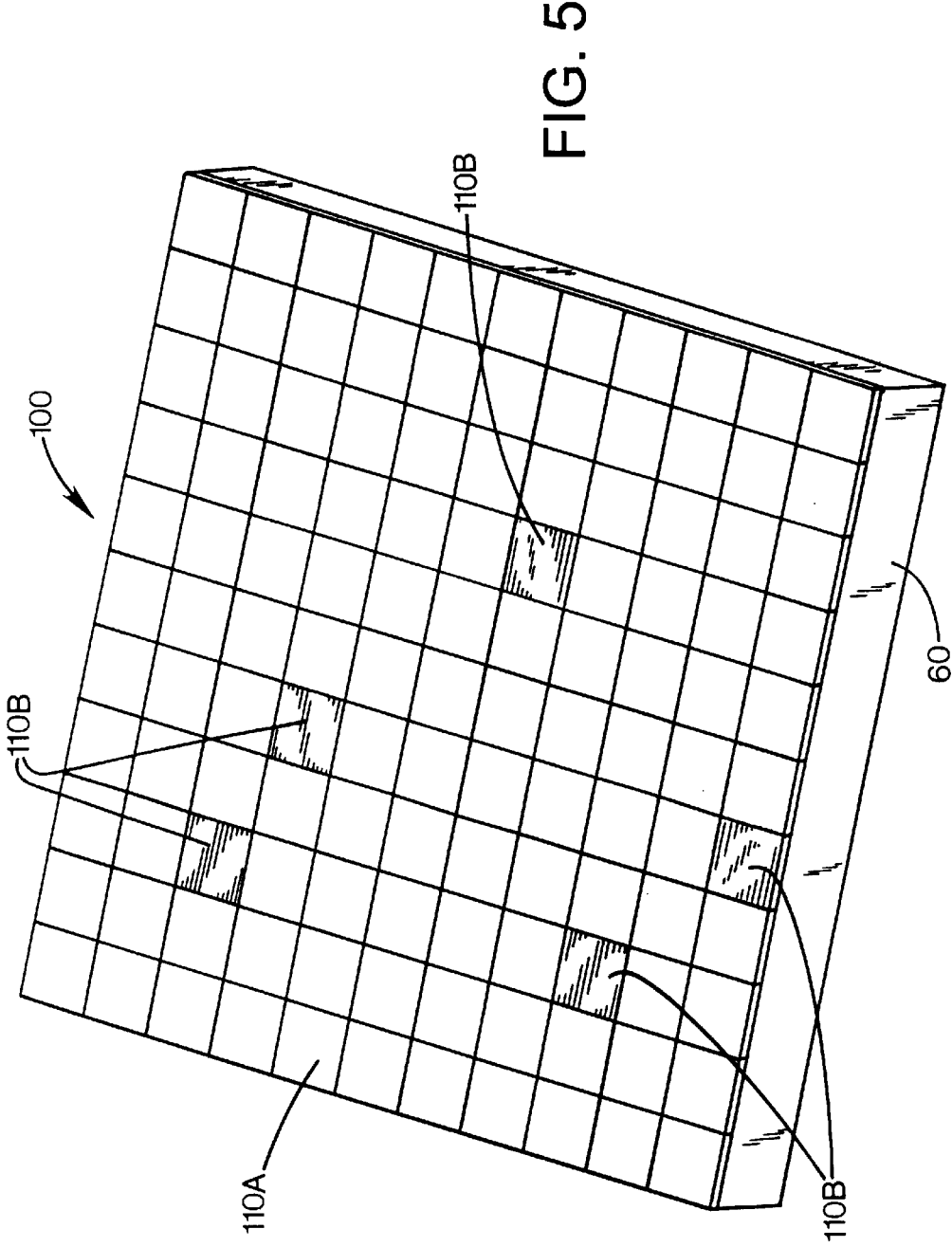
FIG. 5 is an isometric view of the system of FIG. 4, showing several exemplary optical switch elements which have been activated.

FIG. 5 illustrates the operation of the system 100, with most optical switch elements not activated, and a few switch elements activated. Some of the switches which are not activated are labeled switches or pixels 110A, and the activated switches or pixels are labeled as switches 110B. The surfaces of the pixels 110A are reflective, and the surfaces of the pixels 110B are dark and non-reflective.

Figure 6A:
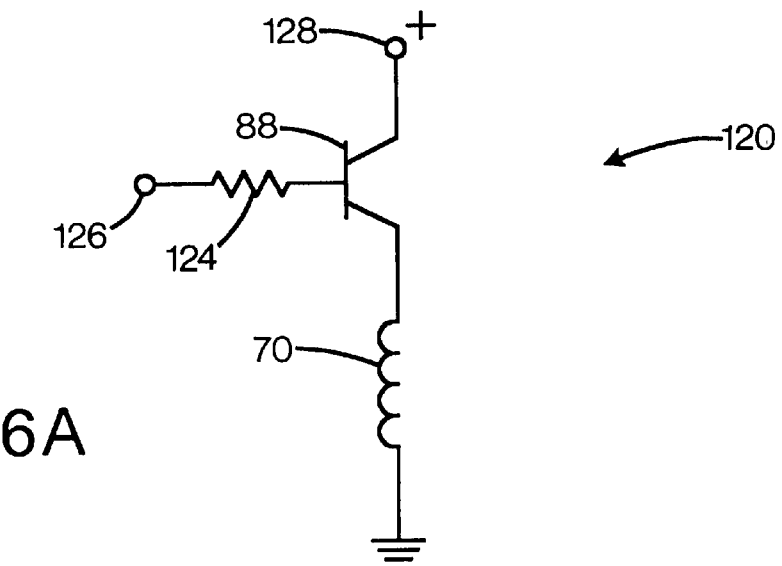
FIG. 6A is a schematic of an exemplary embodiment of a transistor switch circuit for an optical switch element comprising the system of FIGS. 4–5.

FIG. 6A illustrates an exemplary transistor control circuit 120 for activating an exemplary optical switch cell 110. The circuit includes a transistor 88 configured for operation as a switch element, with a gate connected through resistor 124 to a gate terminal 126, to which the control signal is applied. The transistor source is connected to a positive voltage source at node 128. The transistor drain is connected through the electromagnet 70 to ground. Thus, one terminal of the electromagnet is connected to the transistor, the other terminal is connected to ground. By application of a control signal of appropriate voltage level, the transistor 88 is turned on, i.e. conductive, allowing current flow from the voltage source through the electromagnet to ground. In the absence of the activating control signal, the transistor is turned off, i.e. non-conductive, and no current flows through the electromagnet.

Figure 6B:
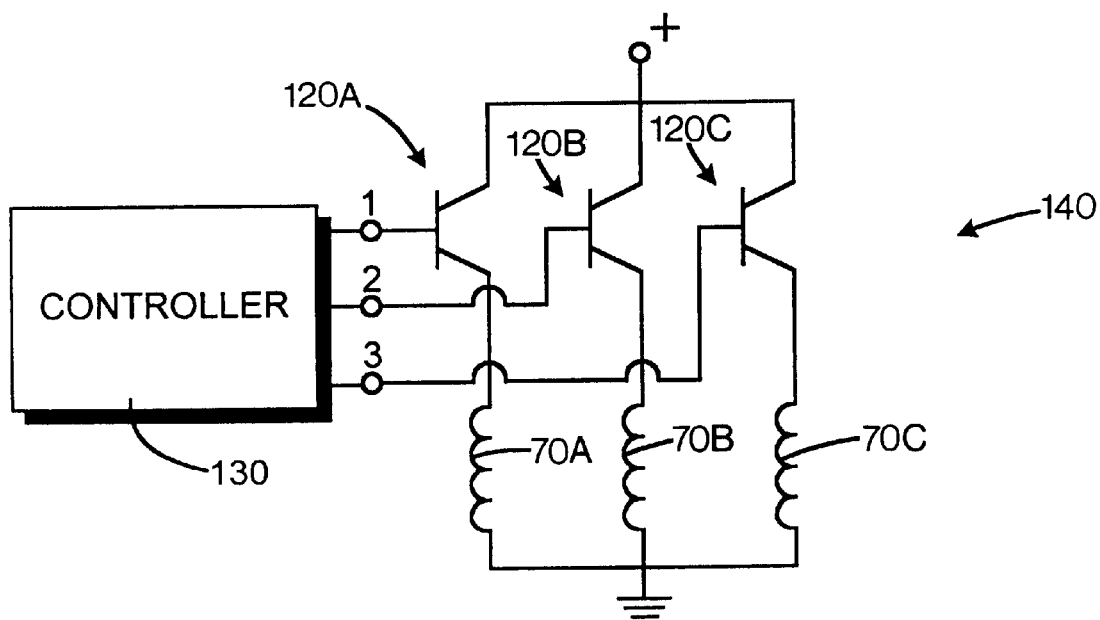
FIG. 6B is a schematic of an exemplary embodiment of a transistor switch circuit for controlling multiple switch elements comprising the system of FIGS. 4–5.

The circuit 120 can be replicated to provide the transistor switch circuits for driving the array of optical elements. FIG. 6B shows a switch circuit 140, comprising a plurality of switch circuits 120A, 120B, 120C arranged to control corresponding electromagnets 70A, 70B, 70C of multiple optical switches 110 comprising the system of FIG. 1. A system controller 130 generates the control signals for selectively activating the transistor circuits, including control signal 1 which controls circuit 120A, signal 2 which controls circuit 120B, and signal 3 which controls circuit 120C. The system controller 130 and the switch circuit 140 provides a means for selectively activating individual ones of the array of electromagnets, by passing current through respective transistor switches, causing the MR fluid directly above the activated electromagnets to self-organize and become dark and non-reflective. Other switch circuits could alternatively be employed. The switch circuit will typically be implemented in an integrated circuit with the array of electromagnets, e.g. in a circuit layer or layers formed on the substrate.

One exemplary application for the system 100 is in a digital projector system, i.e. a display system in which each pixel is either on or off. An exemplary embodiment of a projector system 200 is illustrated in FIGS. 7 and 8. FIG. 7 is a diagrammatic isometric view, and FIG. 7 is a schematic block diagram of the control system. The system 200 includes a light source 210, e.g. a high intensity mercury vapor lamp. Light beam 212 emitted from the light source is passed through a gamut filter 220, which sequentially passes red, green and blue light in a time-multiplexed fashion. The filter 220 can be, for example, a spinning red-green-blue (RGB) filter which rotates about a center axis. The periphery of the filter has three arcuate portions, a red portion, a green portion and a blue portion. Light passed through the filter will be red while the light beam 212 is passing through the red portion, green while the light beam 212 is passing through the green portion, and blue while the light beam 212 is passing through the blue portion. In this exemplary embodiment, each filter portion subtends a 120° arc.

The filtered light beam 226 is passed through a lens 230, which focuses an output beam 232 onto the surface of the system 100. The light is reflected/absorbed by pixels of the system 100, in a manner described above regarding FIG. 5, to produce a display output light beam 242, which in turn is incident on a display output screen 240. The state of the individual pixels or optical light switches is dynamically varying to produce a dynamic display on the screen 230.

FIG. 8 is a simplified control block diagram of the system 200. A system controller 250 controls the color generator 215 comprising the light source 210 and the filter 220, and the spatial light modulator system 50. The controller can comprise a microcomputer, by way of example. Thus, the controller provides suitable control signals to synchronize the filter 220 with the operation of the spatial light modulator, so that, e.g., red light is illuminating the modulator when the pixels are activated for the red component of the image, and so on. For an exemplary application, there will be at least thirty frames per second for each color, or at least ninety frames per second for the color system. These are techniques well known in the display arts.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. An optical switch, comprising:
   a substrate;
   an electromagnet formed on the substrate;
   a transparent cover spaced from the electromagnet on the substrate;
   a magneto rheological (MR) fluid disposed over the electromagnet and sandwiched between the electromagnet and the transparent cover; and
   an air or vacuum gap between a surface of the MR fluid and the transparent cover.

2. The switch of claim 1, further including:
   a control circuit for providing control signals to said electromagnet to selectively activate said electromagnet.

3. The switch of claim 1, wherein the MR fluid is spread evenly over a surface of the electromagnet.

4. The switch of claim 1, wherein, in the absence of a magnetic field, a surface of the MR fluid is reflective, and in the presence of a magnetic field when the electromagnet is activated, the MR fluid self-organizes and the surface becomes dark and non-reflective.

5. The switch of claim 1, further comprising a source of light directed onto the surface of the MR fluid.

6. The switch of claim 1, wherein the electromagnet comprises a ferromagnetic core, and a coil fabricated of an electrically conductive material.

7. The switch of claim 6, wherein the electromagnet is about 100 microns wide and 100 microns long.

8. The optical switch of claim 1, wherein the substrate is a silicon substrate.

9. A spatial light modulator comprising the optical switch of claim 1.

10. An optical projector, comprising the optical switch of claim 1.

11. The optical projector of claim 10, further comprising:
    a light source for generating a light beam;
    a color gamut filter disposed between the light source and the optical switch, the optical switch disposed such that light passing through the filter is reflected from the optical switch onto a display screen.

12. An optical system, comprising:
    a layer of magneto rheological (MR) fluid having a surface exposed to air or vacuum;
    the MR fluid having a first state wherein the surface is reflective, and a second state wherein the surface is non-reflective; and
    a magnetic actuator for selectively applying a magnetic field to the MR fluid to actuate the fluid to the second state.

13. The system of claim 12, further including:
    a control circuit for providing control signals to said magnetic actuator to apply the magnetic field.

14. The system of claim 12, further comprising a source of light directed onto the surface of the MR fluid.

15. The system of claim 12, wherein the magnetic actuator comprises an electromagnet having a magnetic core, and a coil fabricated of an electrically conductive material.

16. An optical switch comprising the system of claim 12.

17. An optical switch array, comprising:
    a substrate;
    an array of electromagnets formed on the substrate;
    a transparent cover spaced from the array of electromagnets on the substrate;
    a magneto rheological (MR) fluid disposed over the array of electromagnets between the electromagnets and the transparent cover; and
    an air or vacuum gap between a surface of the MR fluid and the transparent cover.

18. The optical switch array of claim 17, further including:
    a control circuit for providing control signals to said array of electromagnets to selectively activate electromagnets comprising the array.

19. The optical switch array of claim 17, wherein the MR fluid is spread evenly over the surface of the electromagnet array.

20. The optical switch array of claim 17, wherein, in the absence of a magnetic field, the MR fluid has a reflective surface, and further comprising:
    means for selectively activating individual ones of said array of electromagnets by passing current through an array of transistor switches, causing the MR fluid above the activated electromagnets to self-organize and become dark and non-reflective.

21. The optical switch array of claim 17, further comprising a source of light directed onto the surface of the MR fluid.

22. The optical switch array of claim 17, wherein each electromagnet comprises a coil fabricated of an electrically conductive material, and a magnetic structure.

23. The optical switch array of claim 22, wherein each of the electromagnets is about 100 microns wide and 100 microns long.

24. The optical switch array of claim 17, wherein the substrate is a silicon substrate.

25. A spatial light modulator comprising the optical switch array of claim 17.

26. An optical projector, comprising the optical switch array of claim 17.

27. The optical projector of claim 26, further comprising:
    a light source for generating a light beam;
    a color gamut filter disposed between the light source and the optical switch array, the optical switch array disposed such that light passing through the color gamut filter is reflected from the optical switch array onto a display screen.

28. The optical projector of claim 27, further including a lens for focusing the light beam onto the optical switch array.

29. An optical display projector, comprising:
    a display screen;
    a projector light source for generating a projector light beam;
    a spatial light modulator having a modulator surface for reflecting the projector light beam in a spatially modulated pattern onto the display screen, the spatial light modulator comprising:

a substrate;

an array of electromagnets formed on the substrate;

a transparent cover spaced from the array of electromagnets on the substrate;

a magneto rheological (MR) fluid disposed over the array of electromagnets between the electromagnets and the transparent cover; and an air or vacuum gap between a surface of the MR fluid and the transparent cover.

30. The projector of claim 29, further comprising an optical filter system for filtering the projector light beam to provide different time-multiplexed color components.

31. The projector of claim 30, wherein the optical filter system comprises at least one of a spinning red, green or blue filter structure.

32. A method for modulating a light beam, comprising:

directing the light beam onto a surface of a magneto rheological (MR) fluid, the MR fluid having a first state wherein the surface is reflective to reflect the light beam, and a second state wherein the surface is non-reflective; and selectively applying a magnetic field to the MR fluid to actuate the fluid to the second state to modulate an intensity of a portion of the light beam reflected from the surface of the MR fluid.

* * * * *